No. 683,104. Patented Sept. 24, 1901.
D. DAGGETT.
CALF WEANER.
(Application filed July 30, 1901.)
(No Model.)
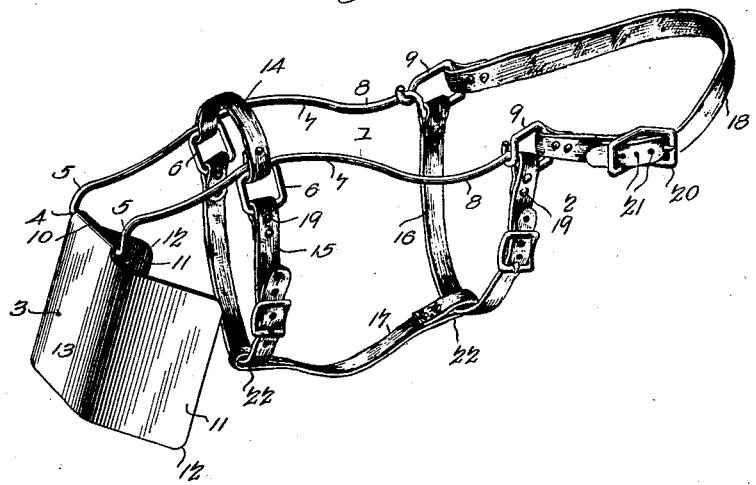
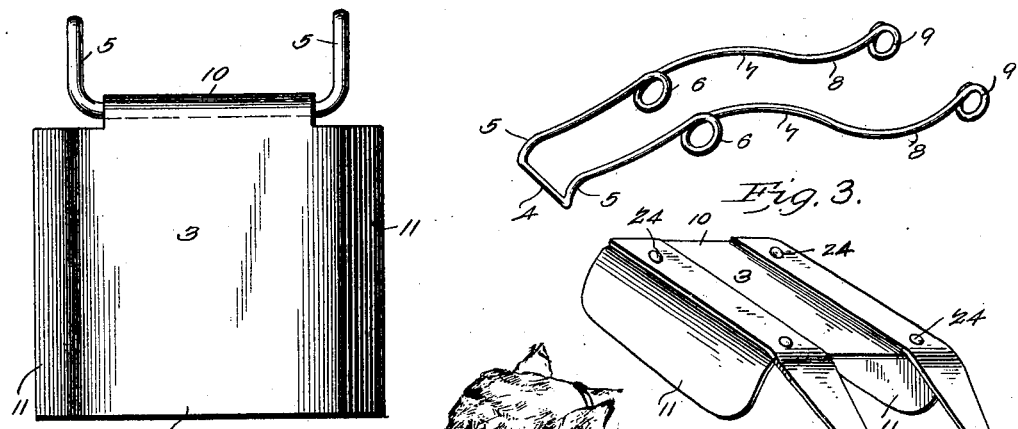
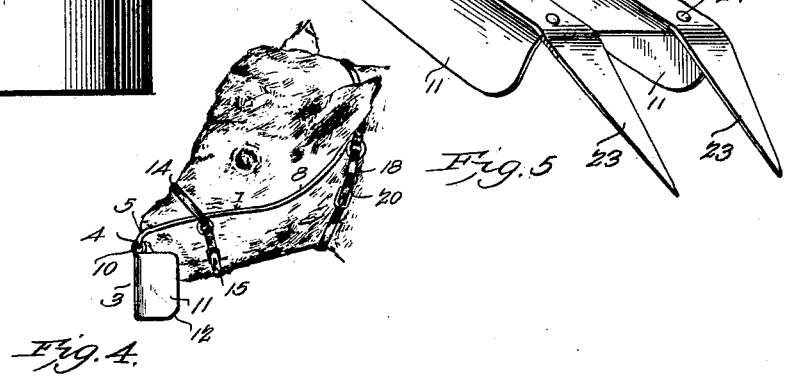
Witnesses
E. F. Stewart
R. M. Elliott
Daniel Daggett, Inventor
by C. A. Snow & Co.
Attorneys

UNITED STATES PATENT OFFICE.

DANIEL DAGGETT, OF LEXINGTON, NEBRASKA.

CALF-WEANER.

SPECIFICATION forming part of Letters Patent No. 683,104, dated September 24, 1901.

Application filed July 30, 1901. Serial No. 70,285. (No model.)

*To all whom it may concern:*

Be it known that I, DANIEL DAGGETT, a citizen of the United States, residing at Lexington, in the county of Dawson and State of Nebraska, have invented a new and useful Calf-Weaner, of which the following is a specification.

This invention relates to calf-weaners, and has for one object to present a weaner which may be worn by an animal with perfect comfort and which will not interfere with its breathing or the free use of its jaws in eating and that shall be thoroughly effective for preventing the animal from suckling.

A further object of the invention is to construct the same of as few number of parts as possible and to combine these in such manner as to produce the most satisfactory results in use.

With these and other objects in view, as will appear as the nature of the invention is better understood, the same consists in the novel construction and combination of parts of a calf-weaner, as will be hereinafter fully described, and specifically pointed out in the claims.

In the accompanying drawings, forming a part of this specification, and in which like numerals of reference indicate corresponding parts, there is illustrated a form of embodiment of the invention capable of carrying the same into effect, it being understood that the elements herein exhibited may be varied or changed as to shape, proportion, and exact manner of assemblage without departing from the scope of the invention.

In the drawings, Figure 1 is a view in perspective, exhibiting a weaner constructed in accordance with the invention. Fig. 2 is a view in front elevation, exhibiting more particularly the construction of the shield or blab. Fig. 3 is a perspective view of the supporting-frame, showing a slightly-modified form of strap-engaging eye from that shown in Fig. 1. Fig. 4 is a view in elevation, showing the device in position upon the head of a calf. Fig. 5 is a detail view of a modified form of blab.

While the invention is herein designated as a "calf-weaner," it is to be understood that it is not to be limited in use to the employment upon calves alone, as it may be used upon colts or other animals when it is desired to effect weaning.

Referring to the drawings, 1 designates generally the frame of the weaner, 2 generally the halter, and 3 the shield or blab. The frame 1, which constitutes one of the essential features of this invention, is constructed of a single piece of wire, preferably of non-corrosive character, such as galvanized-iron wire. In constructing the frame a piece of wire of suitable length is taken and bent to present a cross-bar 4, upon which the shield is pivoted. The two members of the wire are then bent approximately at right angles to their lengths to present two offsets or shoulders 5, thence at a predetermined point from the shoulders into two eyes 6, and thence from the eyes rearward into compound curves, (designated by 7 and 8,) the terminals of the two members being turned upon themselves to present two eyes 9. In the construction of this frame no intricate machinery will be employed, as a mechanic of ordinary ability can readily shape them to the contour shown with a pair of ordinary round-nosed pliers. The form of frame herein shown has been found from experience to be best adapted in the presentation of a comfortable and readily-applicable device; but it is to be understood that this precise arrangement of the parts of the frame may in practice be departed from and still be within the scope of the invention.

Connected with the cross-bar 4 is the shield or blab 3, the same being constructed of a piece of sheet metal, preferably of sheet-iron, and has its center portion provided with a tongue 10, that is turned around the cross-bar, as clearly shown in Figs. 1 and 2, thereby presenting an effective hinge. The shield is, when viewed in plan, approximately semicircular in shape and has two side wings 11, having their corners rounded, as at 12, to prevent any injury to the animal's tongue should it lick the same around these corners; and the shield is of sufficiently greater width than the space between the two shoulders 5 as effectually to prevent the shield from being thrown backward over or on top of the animal's nose, this being obviated, as will be readily appreciated, by a contact between the shoulders 5 and the front wall 13 of the shield. While the form of shield herein shown will be thoroughly effective in use and will generally be preferred on account of its simplicity of construction and the advantages accruing from its use, it is to be understood that this element may be otherwise constructed and still be within the scope of the invention.

The halter 3, to which reference has been made, comprises a nose-strap 14, a jaw-strap 15, a throat-latch 16, a tie-strap 17, connecting the jaw-strap and the throat-latch, and a head-strap 18. The ends of these respective straps, with the exception of the tie-strap, are held assembled with the frame by having their ends passed through the eyes 6 and 9 and then riveted to the body of the strap, the rivets being indicated by 19. Rivets are employed in the present instance on account of being cheap, strong, and readily applied; but it will be obvious that the end of each strap may be stitched to the body portion thereof, if this manner of assemblage be preferred. The jaw-strap 15, throat-latch 16, and head-strap 18 are each composed of two parts, one of which carries a buckle 20 of the ordinary or preferred construction and the other part being provided with holes 21 to engage the tongue of the buckle, as usual, and by this arrangement the different straps may be readily adjusted to fit the head of the animal. The tie-strap 17 is provided at each end with a loop 22, and through these loops pass, respectively, the jaw-strap and the throat-latch, as clearly shown in Fig. 1, the tie-strap operating to prevent the animal from working the jaw-strap free from its head and thereby rendering the device inoperative. As herein shown, the tie-strap is non-adjustable; but it is to be understood that it may be made in two parts held together by a buckle to permit of ready adjustment, as required, and as this will be obvious detailed description is deemed unnecessary.

The eyes 6 and 9 in the form of frame shown in Fig. 1 are approximately rectangular in shape, while those shown in Fig. 3 are circular, and it is to be understood that in carrying the invention into effect either form of eyes shown may be employed as found best suited for the purpose.

As described, the device is adapted for use on a calf; but in practice it has a wider range of utility, inasmuch as by a slight change in the construction of the blab, or rather by a simple addition thereto, the device may be employed for breaking cows from suckling themselves, which may be readily accomplished when the animal is lying down. To effect this, the form of blab shown in Fig. 5 is employed, wherein is exhibited a blab provided with prongs or prods 23, which extend beyond the lower end of the blab and curve slightly inward toward the mouth of the animal. These prods 23 are each formed of a strip of metal secured by rivets 24 to the front of the blab adjacent to the side wings 11 and parallel therewith, the ends of the prods being of sufficient sharpness to cause pain without injury to the animal, so that when the cow has one of these devices applied to its head a few pricks from the prongs will effectually break the habit referred to.

A salient point of this invention and that which renders it thoroughly effective in use against discomfort to the animal and an absolute avoidance of any possibility of a calf side suckling is the disposition of the shield below the nostrils of the calf, as exhibited in Fig. 4, this being effected by constructing the shoulders 5 of such length as to bring the hinge of the shield below the nostrils, while side suckling is obviated by the provision of the side wings 11, which while being thoroughly effective for the latter purpose will not in the least interfere with the animal while grazing or otherwise feeding.

To position the weaner upon the animal, the jaw-strap, throat-latch, and head-strap are unbuckled and the weaner placed upon the animal's head with the side members thereof bearing against the animal's jaws and with the nose-strap 14 bearing upon the top of the animal's nose, after which the three straps first mentioned are buckled in position, respectively, around the jaw of the animal, under its throat, and over its head back of the ears. When thus positioned, the weaner will be held firmly in place against detachment.

Having thus fully described the invention, what I claim, and desire to secure by Letters Patent, is—

1. A calf-weaner comprising a frame having its side portions provided with means of attachment to a halter, and its front portion provided with a downwardly-disposed offset, and a shield hinged to the offset and of greater width than the same, substantially as and for the purpose specified.

2. In a calf-weaner, a frame having its front portion provided with a cross-bar and shoulders adjacent thereto, the side portions of the frame being provided at one end and intermediate of their ends with eyes to be engaged by the members of a suitable halter, and a shield hinged to the cross-bar and being of greater width than the space between the shoulders, substantially as described.

3. In a calf-weaner, a frame having its front portion provided with a cross-bar and shoulders adjacent thereto, the members of the frame being provided at one end, and intermediate of their ends with eyes to be engaged by the members of a suitable halter, and an approximately semicircular shield having a tongue hinged to the cross-bar, the shield having side wings extending laterally beyond the frame members, substantially as described.

4. In a calf-weaner, the combination with a frame supporting a shield of greater width than the frame, the members of the frame being provided at one end and intermediate of their ends with eyes, of a nose-strap and jaw-strap engaging the intermediate set of eyes, a throat-latch and a head-strap engaging the terminal eyes, and a tie-strap connecting the jaw-strap and throat-latch, substantially as described.

5. In a device of the character specified, the combination with the blab, of prongs or prods projecting rearward from the lower edge thereof, substantially as described.

In testimony that I claim the foregoing as my own I have hereto affixed my signature in the presence of two witnesses.

DANIEL DAGGETT.

Witnesses:
   JOHN B. HUGHES,
   W. L. DEVINE.